(12) United States Patent
Durai (10) Patent No.: US 8,200,768 B2
(45) Date of Patent: Jun. 12, 2012

(54) DEFERRED READING OF EMAIL DATABASE IN MOBILE ENVIRONMENTS

(75) Inventor: Ponnusamy Jesudoss Durai, Meridian, ID (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 12/432,425

(22) Filed: Apr. 29, 2009

(65) Prior Publication Data
US 2010/0281119 A1 Nov. 4, 2010

(51) Int. Cl.
G06F 15/16 (2006.01)

(52) U.S. Cl. ......................... 709/206; 709/224

(58) Field of Classification Search .......... 709/206–207, 709/224
See application file for complete search history.

(56) References Cited

U.S. PATENT DOCUMENTS

| | | | |
|---|---|---|---|
| 5,377,354 A * | 12/1994 | Scannell et al. | 718/103 |
| 6,356,633 B1 * | 3/2002 | Armstrong | 379/265.11 |
| 6,611,519 B1 * | 8/2003 | Howe | 370/386 |
| 7,092,707 B2 * | 8/2006 | Lau et al. | 455/423 |
| 7,120,865 B1 * | 10/2006 | Horvitz et al. | 715/210 |
| 7,281,201 B2 * | 10/2007 | Kumar et al. | 715/255 |
| 7,305,402 B2 * | 12/2007 | Hind et al. | 707/812 |
| 7,324,510 B2 * | 1/2008 | Howe | 370/386 |

* cited by examiner

*Primary Examiner* — Hussein A. Elchanti
(74) *Attorney, Agent, or Firm* — Sterne, Kessler, Goldstein & Fox PLLC (57) ABSTRACT

Systems, methods, computer program product embodiments for deferred reading of email databases are described herein. An embodiment includes an event listener configured to poll (or query) the email server and selectively read an email database associated with the email server. Such a selective database read operation is based on the priority of an event occurring in the email server. If events of a low priority occur, the event listener does not open the email database immediately to retrieve additional information related to the low priority event but defers reading the email database by a pre-determined amount of time. If a higher priority event occurs, the email database is immediately read to retrieve details related to the high priority event from the mail server database. In another embodiment, event listener reads the email database based on when event timestamp information is updated by the email server.

18 Claims, 7 Drawing Sheets

DEFERRED READING OF EMAIL DATABASE IN MOBILE ENVIRONMENTS

CROSS REFERENCE TO RELATED APPLICATIONS

This patent application is related to U.S. patent application Ser. No. 12/432,330, filed on Apr. 29, 2009, entitled "An Active/Push Notification Facade For a Passive Database System," and to U.S. patent application Ser. No. 12/104,905 filed on Apr. 17, 2008, entitled "Synchronizing Communications and Data Between Mobile Devices and Servers," both of which are incorporated by reference herein in their entireties.

BACKGROUND

1. Field of the Invention

The present invention relates generally to mobile communications and, more particularly, to polling email servers and reading data from email databases.

2. Background Art

Mobile devices are in common usage, many featuring powerful processors, larger and more colorful displays, and wireless networking capabilities. Despite these advances in mobile technology, mobile devices typically have greater limitations on memory capacity, data storage capacity, central processing unit (CPU) capacity, and networkability than workstation computers. These limitations require efficient use of resources in a mobile environment.

Interaction using data sets exchanged between mobile devices and email servers often occurs in the context of exchanges of email, calendar appointments, application data, business process tasks, and information stored in email databases. Mobile devices need to frequently communicate with email servers to retrieve emails and events related to the emails from email databases.

Many email servers are passive and lack functionality to notify mobile devices of events related to emails. When associated with such passive servers, mobile devices have to frequently poll and read the email database to check if any events, such as arrival of new emails, have occurred. Constant reading of an email server's database to check email and appointment information consumes valuable network resources. Furthermore, mobile devices use a substantial portion of CPU capacity to perform continuous polling and read operations.

Therefore, systems, methods and computer program products are needed that overcome the limitations of existing email database reading techniques and allow mobile devices to more efficiently retrieve emails and other related events from email databases.

BRIEF SUMMARY

Briefly stated, the invention includes system, method, computer program product embodiments and combinations and sub-combinations thereof for deferred reading of email databases.

An embodiment includes an event listener configured to poll (or query) the email server and read an email database associated with the email server.

The event listener selectively reads the email database based on the priority of an event occurring in the email server. As an example, an operation that includes opening of an email by a user on a mobile device or moving an email between two folders on a mobile device may be categorized as a low priority event. Events such as arrival of a new email in the email server may be categorized as high priority events.

If events of a low priority occur, the event listener does not open the email database immediately to retrieve additional information related to the low priority event but defers its action of reading the email database by a pre-determined period of time. If a higher priority event occurs, the email database is more immediately opened to read details related to the high priority event from the email database. Therefore, event listener proceeds to read the email database after the lapse of a pre-determined amount of time or the occurrence of a high priority event, whichever of these events occurs first.

In another embodiment, the email server is configured to update timestamp information for high priority events. When the event listener determines that a timestamp has been updated, it also determines that a high priority event has occurred and proceeds to access the email database to retrieve information related to that high priority event from the email database.

In this way, the email database is not read for each email related event, thereby saving valuable computational resources. Furthermore, by deferring reading of the email database, information related to multiple low priority events can be retrieved by the event listener in a single read operation instead of multiple read operations. Also, in an embodiment, the event listener needs only to check timestamp(s) in the email server to determine occurrence of high priority events that would necessitate reading of the email database.

Further embodiments, features, and advantages of the invention, as well as the structure and operation of the various embodiments of the invention are, described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

System

Figure 1A:
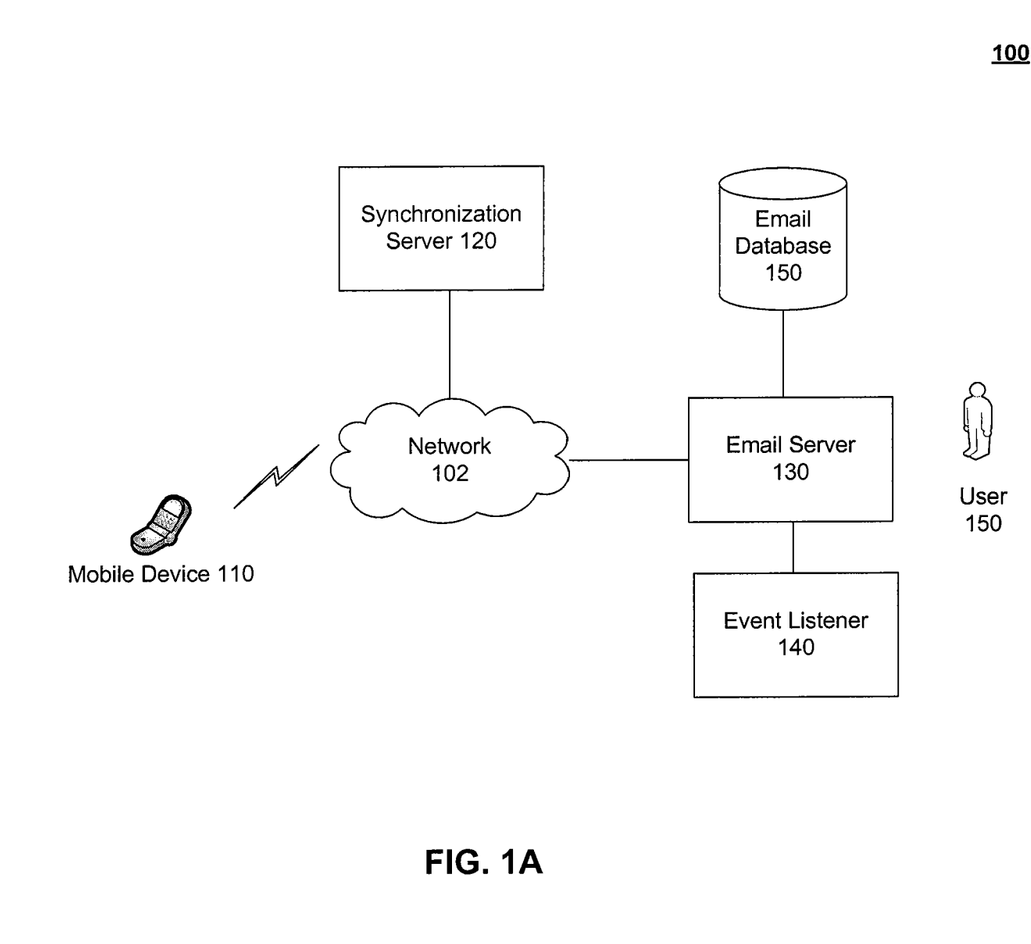
FIG. 1A illustrates a system for deferred polling of email databases, according to an embodiment of the invention.

FIG. 1A illustrates an exemplary system 100 for deferred reading of email databases, according to an embodiment of the invention. (While the following is described in terms of mobile environments and mobile devices, the invention is not limited to this embodiment. The invention is applicable to any system having generally the structure of FIG. 1A, or that would benefit from the function as described herein.)

System 100 includes mobile device 110, synchronization server 120, email server 130, event listener 140 and email database 150.

Mobile device 110 can include, but is not limited to, a device having a processor and memory for executing and storing instructions. Such a mobile device may include software, firmware, and hardware or some combination thereof. The software may include one or more applications and an operating system. The hardware can include, but is not limited to, a processor, memory and user interface display. An optional input device, such as a mouse, stylus or any other pointing device, may be used. In an embodiment, mobile device 110 includes a client application that receives and displays emails and notifications to a user.

Mobile device 110 may be one of many devices commonly designated as mobile clients, such as, but not limited to, personal digital assistants ("PDAs"), devices operating according to the Microsoft Pocket PC specification with the Microsoft Windows® CE operating system (OS), devices running the Symbian OS, devices running the Palm OS®, mobile phones, BlackBerry® devices, smart phones, hand held computers, palmtop computers, laptop computers, ultra-mobile PCs, and other wireless mobile devices capable of running mobile applications.

Although FIG. 1A illustrates a single mobile device 110 for clarity, it is to be appreciated that system 100 is scalable and a plurality of mobile devices can connect to synchronization server 120 and email server 130 via network 102.

Network 102 may include one or more networks, including but not limited to, a local area network, medium-area network, and/or wide-area network, such as, the Internet. Network 102, for example, may be a wired or wireless network that allows mobile device 110, synchronization server 120, and email server 130 to communicate with each other. Network 102 can further support world-wide web protocols and services.

Mobile device 110 may receive current data on synchronization server 120 via network 102. Mobile devices may upload their current data to synchronization server 120 for any given application or set of applications. For example, a calendar application might allow other users to add or make changes to appointments which are then stored on synchronization server 120. A user of mobile device 110 may also have added, deleted, or made changes to appointments within mobile device 110 itself. Upon synchronization, synchronization server 120 learns of the appointments made, changed, or deleted on mobile device 110, and mobile device 110 learns of appointments made, changed, or deleted on server 120. In accordance with an additional embodiment of the present invention, a partial synchronization is possible, whereby some subset of appointments may be exchanged.

In accordance with an embodiment, data stored in email database 150 may also be synchronized with local data stores or databases residing on mobile device 110. "Data" as used herein may be any object, including, but not limited to, information in any form (text, video, audio, multimedia etc.) and applications.

Email server 130 facilitates the routing of email messages from one user to another via network 102. Email servers are well known to those skilled in the art. As an example, email server 130 may receive an email from a user and forward that email to mobile device 110 using synchronization server 120. As an example, not intended to limit the invention, email server 130 is an IBM LOTUS DOMINO email server. In an embodiment, email server 130 also maintains timestamp information for events that occur in email server 130. Such events include, for example, email arrival and email read events.

Email server 150 is associated with email database 150 that stores a plurality of emails, including all metadata associated with the emails. Email database 150 may also store information related to appointments, tasks and a user calendar. Email database 150 may be located within email server 130, in other email servers independent from email server 130 or even exist as an independent database. In an embodiment, email database 150 includes a plurality of mail boxes, with each mail box associated with a unique user.

Event Listener

Event listener 140 determines occurrences of events associated with emails, appointments or any other messaging data in email server 130. Although the following is described in terms of emails and email related events, it is to be appreciated that any other form of information, including, but not limited to, appointments, tasks, contacts or journals may be used by embodiments of the invention.

Figure 1B:
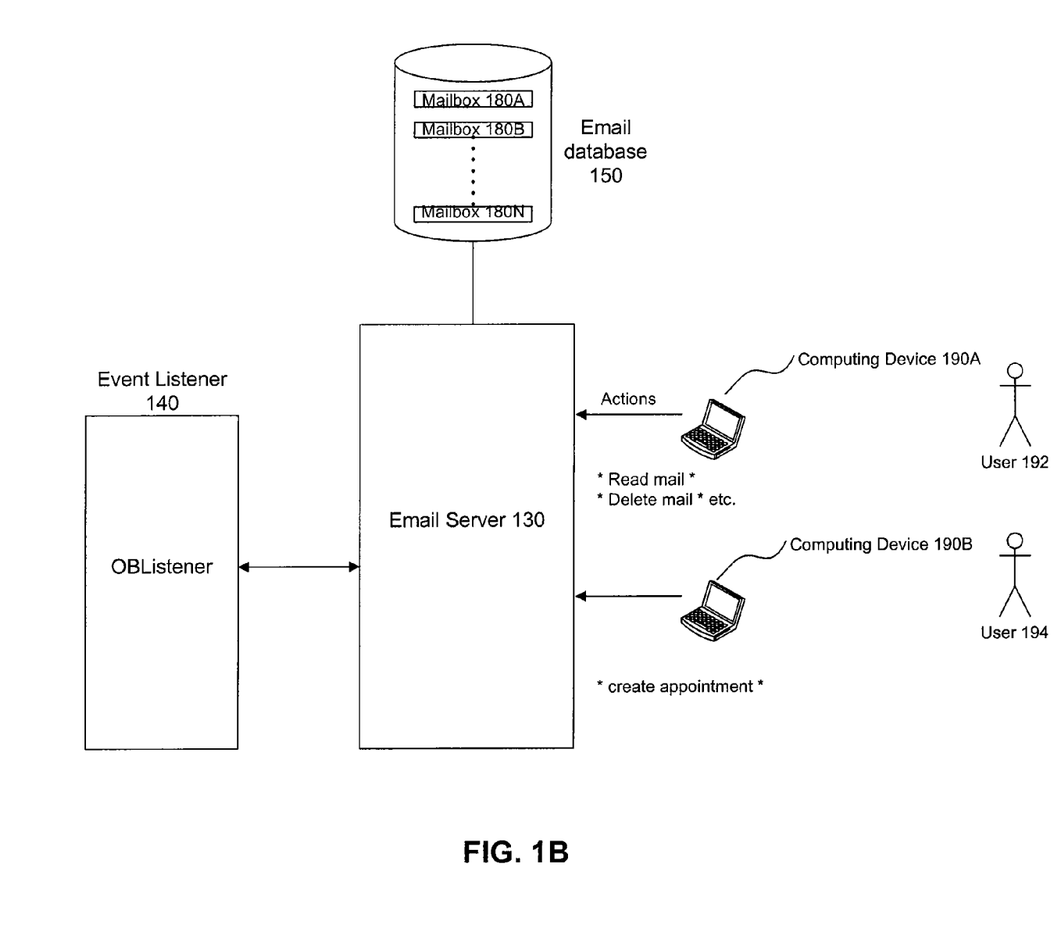
FIG. 1B illustrates an embodiment of an event listener and associated modules, according to an embodiment of the invention.

As an example, not intended to limit the invention, event listener 140 may be implemented as an add-in or a plug-in module for an IBM® LOTUS DOMINO email server. FIG. 1B illustrates an exemplary embodiment of event listener 140. As illustrated in FIG. 1B, event listener 140 is implemented as an "OBListener" module. OBListener communicates (or polls) with email server 130 and determines occurrences of events associated with emails, appointments or any other messaging data in email server 130, according to embodiments of the invention. Email database 150 may include a plurality of mailboxes 180A-N, each associated with a unique user and configured to receive and store user emails along with any metadata associated with those emails. Users 192 and 194 may also communicate with email server 130 using computing devices 190A and 190B (e.g. desktop computers) instead of using their mobile devices to send emails, read emails, delete emails, create appointments and other such operations.

Event listener 140 selectively reads email database 150 based on the priority of an event occurring in email server 130. As an example, an operation that includes opening of an email by a user on mobile device 110 or moving an email between two folders on mobile device 110 may be categorized as a low priority event. Events such as arrival of a new email in email server 130 may be categorized as high priority events. Events can be categorized as low or high priority events according to any pre-defined criteria.

If events of a low priority occur, the event listener does not open email database 150 immediately to retrieve additional information related to the low priority event but defers its action of reading email database 150 by a pre-determined period of time. As an example such a pre-determined amount of time may be configurable and set by an administrator (e.g. user 150) of email server 130.

If a higher priority event occurs, email database 150 is immediately opened to read details related to the high priority event from email database 150. Therefore, event listener proceeds to read email database 150 after the lapse of a pre-determined amount of time or the occurrence of a high priority event, whichever of these events occurs first.

Figure 2A:
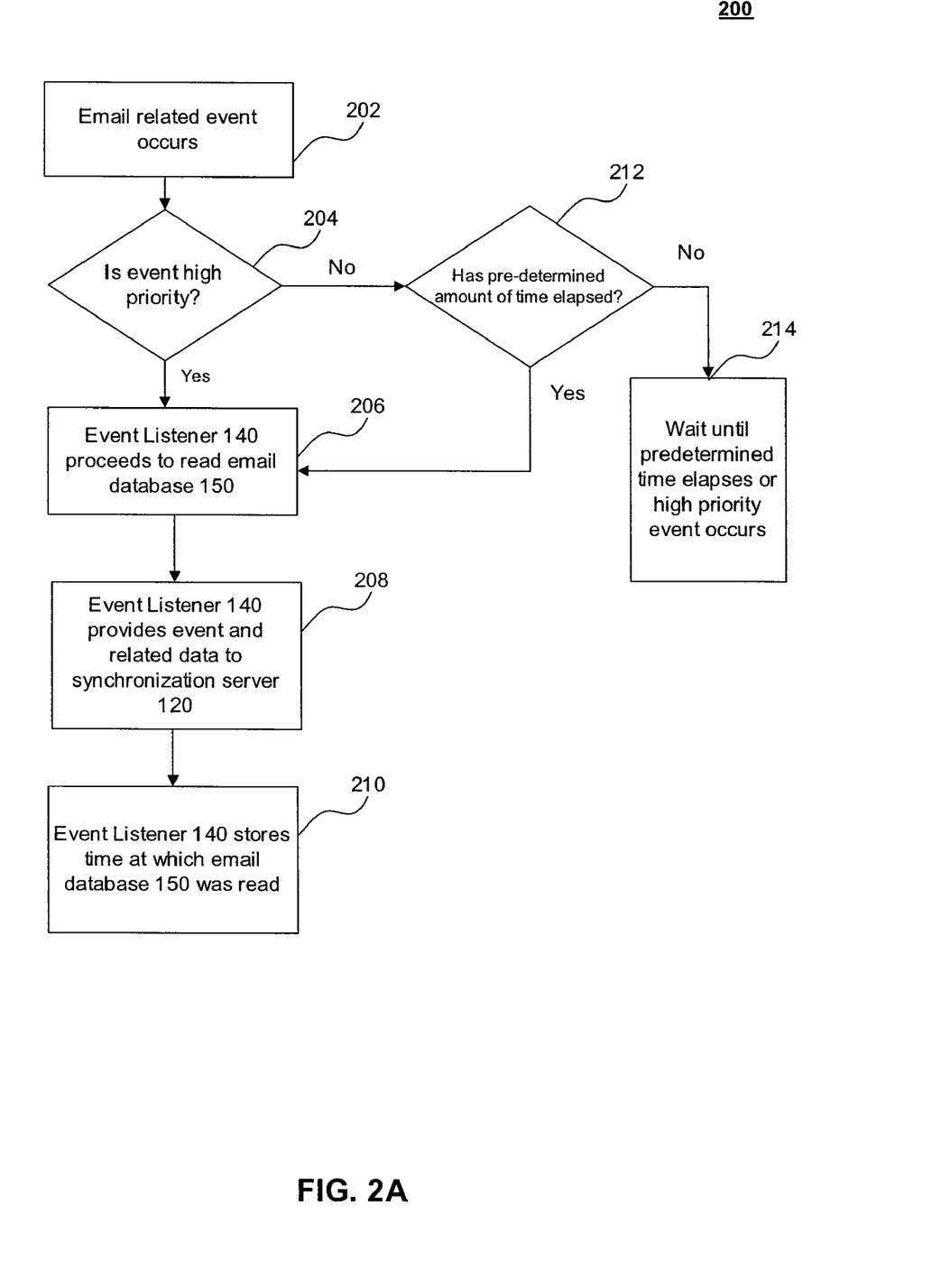
FIG. 2A is a flowchart illustrating an operation of an event listener, according to an embodiment of the invention.

FIG. 2A is method 200, illustrating an operation of event listener 140, according to an embodiment of the invention.

In step 202, an event related to an email occurs in email server 130. As an example, such an event can include an email arrival event or an email read event.

In step 204, event listener 140 determines if the event that occurred in step 202 is a high priority event. As example, a high priority event can include an email arrival event. If event listener 140 determines that a high priority event has occurred (step 204), event listener 140 proceeds to read email database 150 associated with email server 130 to retrieve details of the high priority event (step 206). Such details, for example, include email content and email header information. At this time, the event listener 140 also retrieves details of any deferred low priority events.

In step 208, event listener 140 proceeds to provide the event and data related to the event (e.g. content of an email) to synchronization server 120. Synchronization server 120 may place the event in a queue for subsequent transfer to mobile device 110.

In step 210, event listener 140 stores the time at which email database 150 was last read.

Returning to step 204, if event listener 140 determines that the event was not a high priority event, it does not read email database 150 and proceeds to check if a pre-determined amount of time has elapsed since email database 150 was last checked (step 212).

If a pre-determined amount of time has elapsed (step 212), event listener 140 proceeds to read email database 150 (step 206). If a pre-determined amount of time has not elapsed (step 212), event listener 140 proceeds to wait and does not read email database 150 until the pre-determined amount of time elapses or until an event of high priority occurs at email server 130 (step 214).

In this way, event listener 140 allows one or more low priority events (e.g. read flag events and folder move events) to be read with high priority events (e.g. arrival of a new mail) or after the lapse of a pre-determined amount of time, whichever occurs first. Once email database 150 is read and the all events are queued up in synchronization server 120 for subsequent transfer to mobile device 110. By deferring the read operation of low priority events, embodiments of the invention save significant processing resources.

In another embodiment, event listener 140 reads timestamp information stored in email server 130. In an embodiment each email related event is associated with its own timestamp.

In another embodiment, low priority events (e.g. email read events or email folder move events) may not be associated with time stamps and high priority events (e.g. arrival of new emails) are associated with time stamps. Therefore, if event listener 140 determines that a time stamp value has changed in email server 130, it determines that a high priority event has occurred and event listener 140 immediately proceeds to read details related to the higher priority event from email database 150.

If events of a lower priority occur, the event listener 140 does not open the email database 150 immediately to retrieve additional information related to the lower priority event but defers its action of opening email database 150 by a pre-determined period of time.

As an illustrative example, if no high priority events occur (e.g. email arrival events), event listener 140 does not read email database 150 associated with email server 130. Event listener 140 is able to determine an occurrence of a high priority event by an updated timestamp in email server 130. During the time no high priority events are occurring there may be one or more low priority events that occur. Such low priority events do not cause email server 130 to change or modify the timestamp. Event listener 140 does not read email database 150 for such low priority events. However, event listener 140 proceeds to read email database 150 after the lapse of a pre-determined amount of time or the occurrence of an updated timestamp, whichever of these occurs first.

In this way, event listener 140 allows one or more low priority events (e.g. read flag events and folder move events) to be read with high priority events (e.g. arrival of a new mail) or after the lapse of a pre-determined amount of time, whichever occurs first. Once email database 150 is read and the all events are queued up in synchronization server 120 for subsequent transfer to mobile device 110. By deferring the read operation of low priority events, embodiments of the invention save significant processing resources.

Figure 2B:
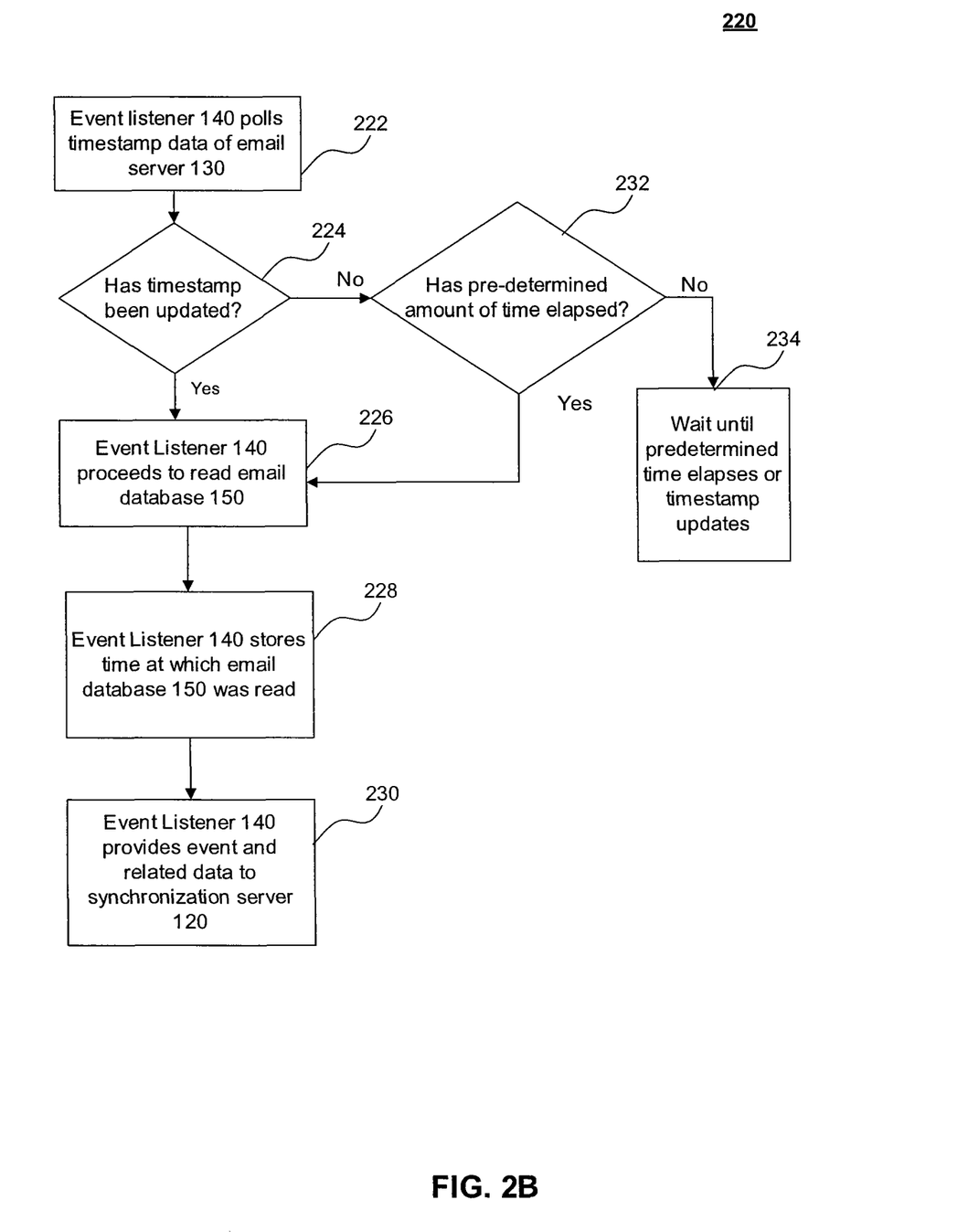
FIG. 2B is a flowchart illustrating an operation of an event listener, according to another embodiment of the invention.

FIG. 2B is method 220 illustrating the operation of event listener 140 according to the above described embodiment of the invention. In the following embodiment, email server 130 is configured to store time stamps for high priority events. Therefore, as described below, event listener 140 reviews timestamp information of email server 130 to identify high priority events.

Method 220 begins with event listener 140 polling email server 130's timestamp information (step 222)

In step 224, event listener 140 determines if email server 130 has updated a timestamp. As described earlier, in this embodiment, email server 130 is configured to store timestamps for high priority events. If event listener 140 determines that a time stamp has been updated (step 224), event listener 140 thereby determines that a high priority event has occurred and immediately reads email database 150 associated with email server 130 to retrieve details of the high priority event (step 226). Such details, for example, include email content and email header information.

In step 228, event listener 140 stores the time at which email database 150 was last read.

In step 230, event listener 140 proceeds to provide the event and any related data to synchronization server 120. Synchronization server 120 may place the event in a queue for subsequent transfer to mobile device 110.

Returning to step 224, if event listener 140 determines that no time stamp has been updated, it does not read email database 150 and proceeds to check if a pre-determined amount of time has elapsed since email database 150 was last read (step 232).

If a pre-determined amount of time has elapsed (step 232), event listener 140 proceeds to read email database 150 (step 226). If a pre-determined amount of time has not elapsed (step 232), event listener 140 proceeds to wait and does not read email database 150 until the pre-determined amount of time elapses or until a time stamp is updated by email server 130 (step 234).

In this way, event listener 140 needs only to check time stamp information of email server 130. Checking for an update to timestamp information in not a resource intensive operation and thus saves system resources while preventing overloading of email server 130.

Synchronization Server

In an embodiment, synchronization server 120 routes communication between email server 130 and mobile device 110. As an example, synchronization server 120 may relay email related events (e.g. moving of an email into a folder) to email server 130. Also, if a new email message arrives at email server 130, event listener 140 forwards a notification of this event to synchronization server 120. In this way, event listener 140 acts as a notification facade for a passive email server 130 that does not provide notification of such events to synchronization server 120. An exemplary notification facade is described in detail in U.S. patent application Ser. No. 12/432,330, filed Apr. 29, 2009, entitled "An Active/Push Notification Facade For a Passive Database System," which is incorporated by reference herein in its entirety. Message communication between synchronization server 120 and mobile device 110 is described in greater detail in U.S. patent application Ser. No. 12/104,905 filed on Apr. 17, 2008, entitled "Synchronizing Communications and Data Between Mobile Devices and Servers," also incorporated by reference herein in its entirety.

Figure 3:
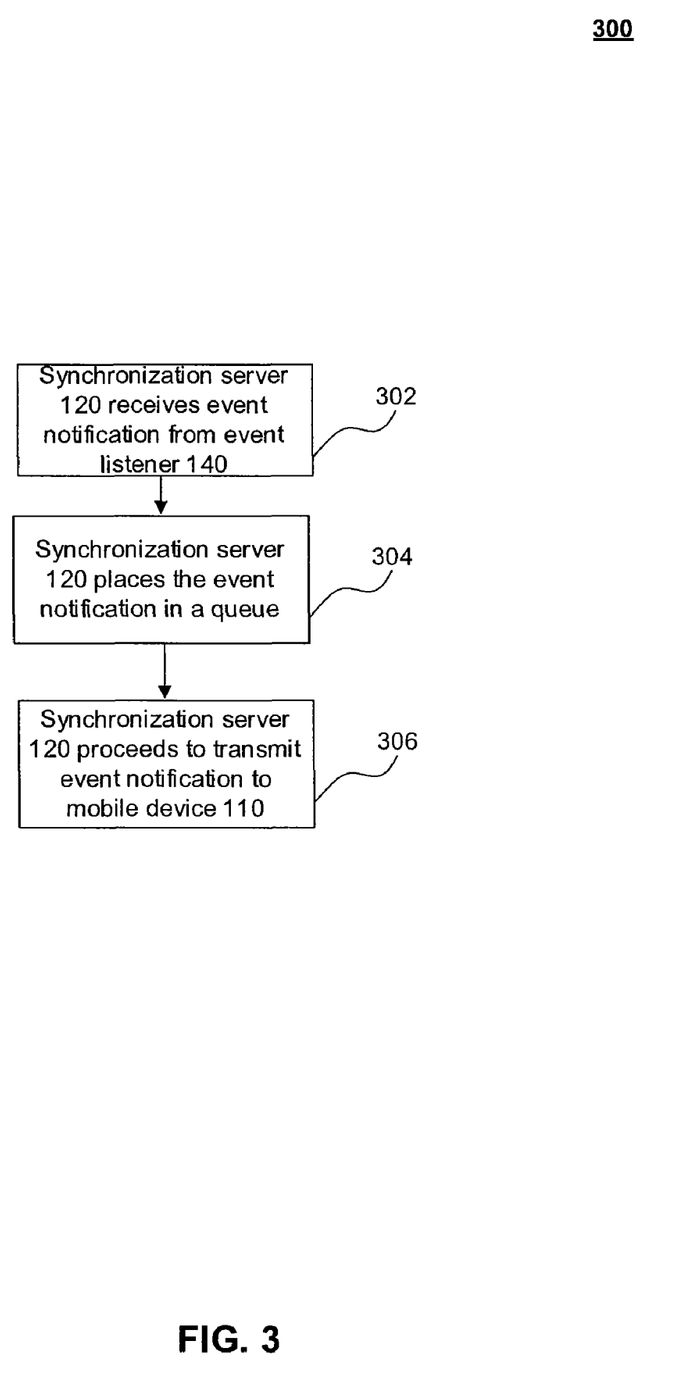
FIG. 3 is a flowchart illustrating an operation of a synchronization server, according to an embodiment of the invention.

FIG. 3 illustrates flowchart 300 describing an exemplary operation of synchronization server 120, according to an embodiment of the invention.

In step 302, synchronization server 120 receives an event notification from event listener 140. As an example, such a notification may be related to the arrival of a new email message at email server 130.

In step 304, synchronization server 120 places the notification of the event in a synchronization queue. As an example, such a synchronization queue may include event notifications that were previously received from event listener 140.

In step 306, synchronization server 120 proceeds to transmit the event notification received in step 302 to mobile device 110. As an example, the event notification may be transmitted to mobile device 110 whenever it is 'online' or connected to network 102. Furthermore, if mobile device 110 is 'offline' or disconnected from network 102, synchronization server 120 may wait to send the event notification to the device till is online. Whenever mobile device 110 receives the event notification from synchronization server 120, an email client instantiated on mobile device 110 displays the event to a user.

In this way, synchronization server 120 communicates event notifications between email server 130 and mobile device 110.

Figure 4:
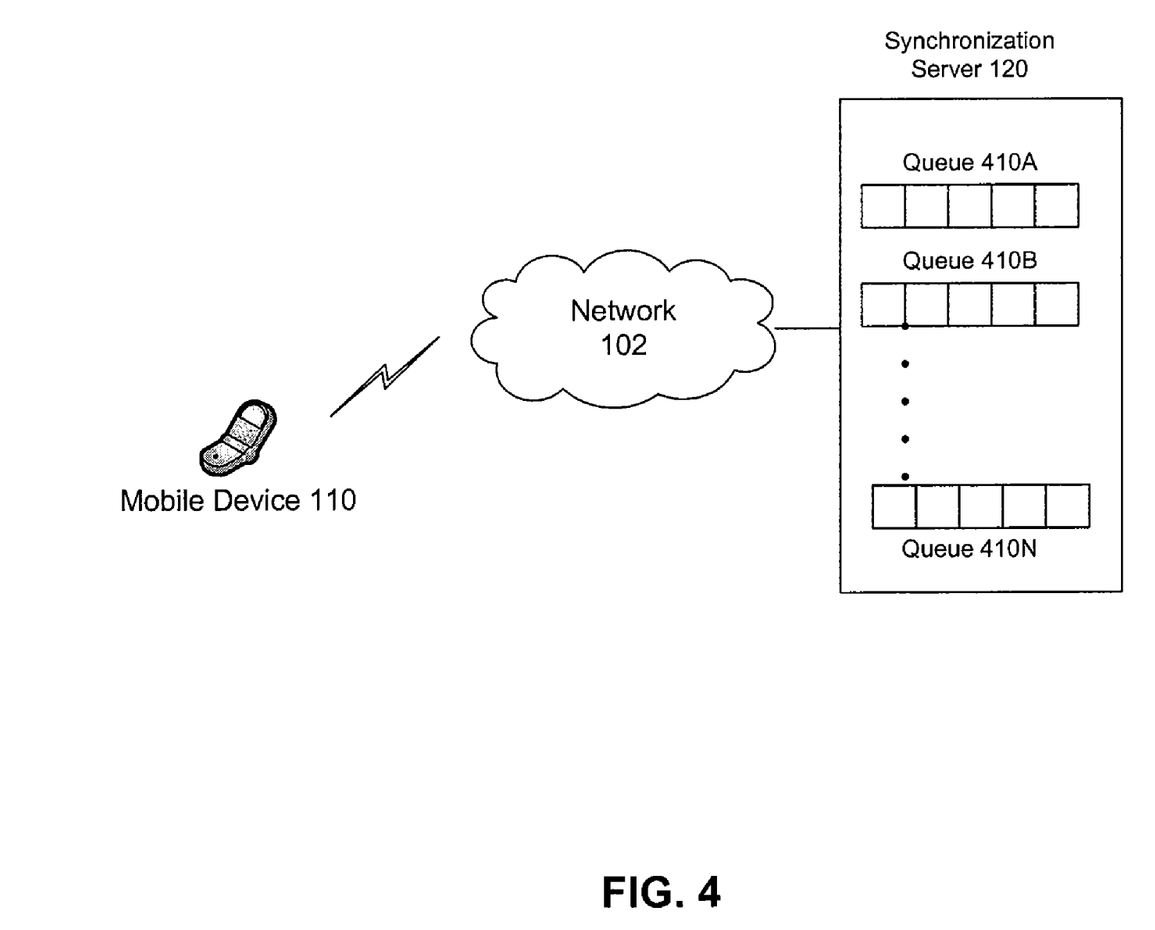
FIG. 4 is a diagram illustrating a plurality of queues in a synchronization server, according to an embodiment of the invention.

FIG. 4 illustrates a plurality of event (or message) queues 410A-410N in synchronization server 120. As illustrated in FIG. 4, embodiments of the invention allow for a separate message queue for each user. In this way, embodiments of the invention allow events to be transmitted from email server 130 to mobile device 110 via synchronization server 120.

Example Computer Embodiment

Figure 5:
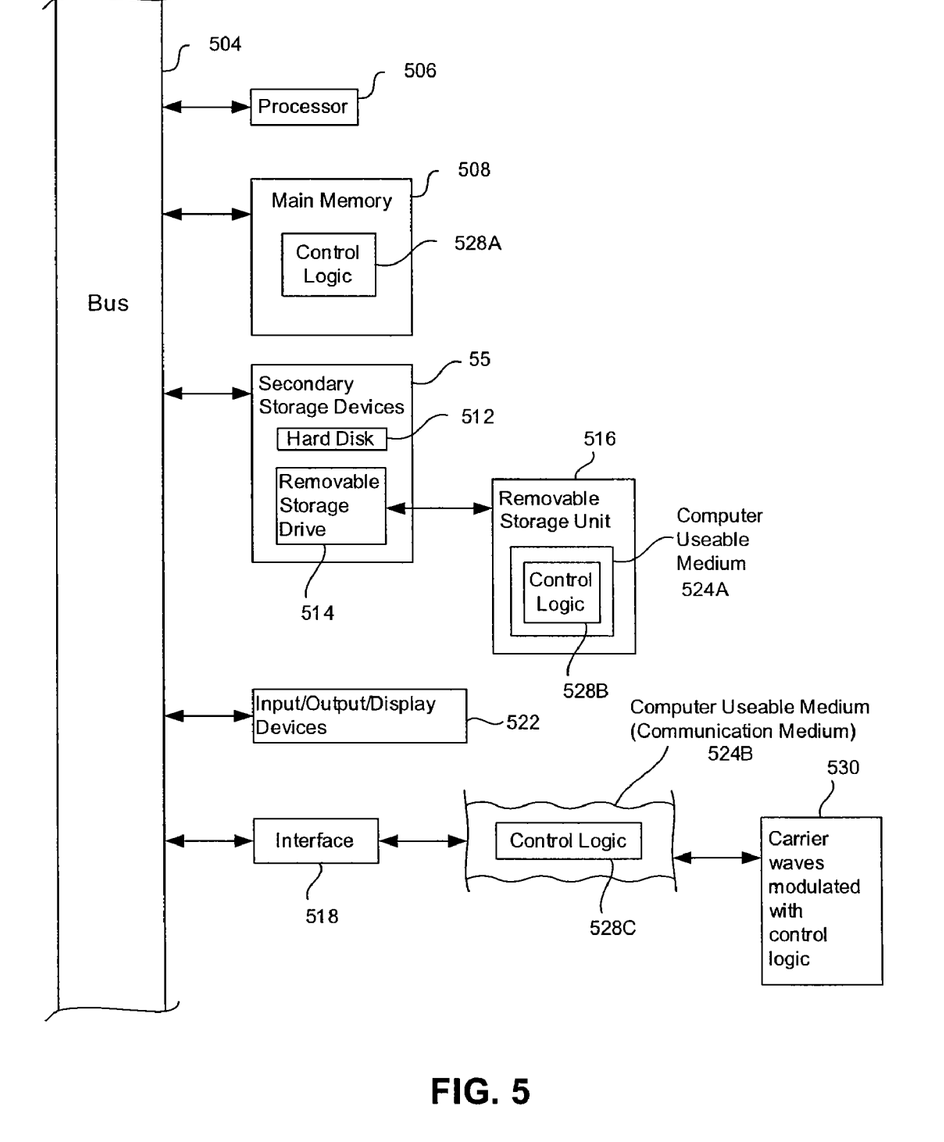
FIG. 5 illustrates an example computer useful for implementing components of embodiments of the invention.

In an embodiment of the present invention, the system and components of embodiments described herein are implemented using well known computers, such as computer 502 shown in FIG. 5. For example, synchronization server 120 or email server 130 can be implemented using computer(s) 502.

The computer 502 can be any commercially available and well known computer capable of performing the functions described herein, such as computers available from International Business Machines, Apple, Sun, HP, Dell, Compaq, Digital, Cray, etc.

The computer 502 includes one or more processors (also called central processing units, or CPUs), such as a processor 506. The processor 506 is connected to a communication bus 504.

The computer 502 also includes a main or primary memory 508, such as random access memory (RAM). The primary memory 508 has stored therein control logic 528A (computer software), and data.

The computer 502 also includes one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer useable or readable storage medium 524 having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well known manner.

The computer 502 also includes input/output/display devices 522, such as monitors, keyboards, pointing devices, etc.

The computer 502 further includes a communication or network interface 518. The network interface 518 enables the computer 502 to communicate with remote devices. For example, the network interface 518 allows the computer 502 to communicate over communication networks or mediums 524B (representing a form of a computer useable or readable medium), such as LANs, WANs, the Internet, etc. The network interface 518 may interface with remote sites or networks via wired or wireless connections.

Control logic 528C may be transmitted to and from the computer 502 via the communication medium 524B. More particularly, the computer 502 may receive and transmit carrier waves (electromagnetic signals) modulated with control logic 530 via the communication medium 524B.

Any apparatus or manufacture comprising a computer useable or readable medium having control logic (software) stored therein is referred to herein as a computer program product or program storage device. This includes, but is not limited to, the computer 502, the main memory 508, secondary storage devices 510, the removable storage unit 516 and the carrier waves modulated with control logic 530. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for deferred reading of data from an email database that includes a plurality of emails, comprising:
   (a) determining an occurrence of an event in an email server;
   (b) determining priority of said event prior to reading said data from said email database;
   (c) reading said email database for said event, when said event is of a first priority; and
   (d) deferring reading of said email database for said event by a pre-determined amount of time, when said event is of a second priority unless another event of a first priority occurs prior to said pre-determined amount of time elapsing,
   wherein steps (a)-(d) are performed using one or more processors.

2. The method of claim 1, wherein step (a) comprises:
   determining if a timestamp associated with said event has been updated by said email server.

3. The method of claim 1, wherein step (b) comprises:
   checking if said event is an email arrival event.

4. The method of claim 1, wherein step (c) comprises:
   reading email content and metadata associated with said email content.

5. The method of claim 1, wherein step (d) comprises:
   deferring reading by a pre-determined amount of time measured from a last stored read time of said email database.

6. The method of claim 1, further comprising:
   storing a time at which said email database is read.

7. The method of claim 1, further comprising:
   transmitting said event to a synchronization server.

8. The method of claim 1, further comprising:
   reading said second priority event to a synchronization server, when said pre-determined time has elapsed; and
   reading said second priority event with said another event of a first priority to said synchronization server, when said another event of a first priority occurs prior to expiration of said pre-determined amount of time.

9. The method of claim 1, wherein said first priority is high priority, and said second priority is low priority.

10. A system for deferred reading of data from an email database that includes a plurality of emails, comprising:
    one or more processors;
    an email server; and
    an event listener to determine an occurrence of an event in said email server prior to reading said data from said email database,
    wherein said event listener reads said email database for said event, when said event is of a first priority and defers reading of said email database for said event by a pre-determined amount of time, when said event is of a second priority unless another event of a first priority occurs prior to said pre-determined amount of time elapsing, and
    wherein said email server and said event listener are implemented using said one or more processors.

11. The system of claim 10, wherein said email server is configured to generate a timestamp for said event.

12. The system of claim 10, wherein said email database comprises one or more mailboxes associated with one or more users.

13. The system of claim 10, further comprising a synchronization server.

14. The system of claim 13, wherein said synchronization server comprises one or more event queues.

15. The system of claim 14, wherein said synchronization server is configured to transmit said events in said event queue to a mobile device.

16. The system of claim 10, wherein said first priority is high priority, and said second priority is low priority.

17. A computer program product including a non-transitory computer-readable storage medium having instructions stored thereon that, if executed by a processing device, cause said processing device to perform operations comprising:
    determining an occurrence of an event in an email server associated with data from an email database, said email database including a plurality of emails;
    determining priority of said event, said priority determined prior to reading said data from said email database;
    reading said email database for said event, when said event is of a first priority; and
    deferring reading of said email database for said event by a pre-determined amount of time has elapsed, when said event is of a second priority unless another event of a first priority occurs prior to said pre-determined amount of time elapsing.

18. The computer program product of claim 17, wherein said first priority is high priority, and said second priority is low priority.

* * * * *

UNITED STATES PATENT AND TRADEMARK OFFICE
CERTIFICATE OF CORRECTION

PATENT NO.      : 8,200,768 B2
APPLICATION NO. : 12/432425
DATED           : June 12, 2012
INVENTOR(S)     : Ponnusamy Jesudoss Durai It is certified that error appears in the above-identified patent and that said Letters Patent is hereby corrected as shown below:

Column 10
Line 51, Claim 17, please replace "by" with --until--.

Signed and Sealed this
Twenty-seventh Day of November, 2012

David J. Kappos
*Director of the United States Patent and Trademark Office*